United States Patent [19]

Ritter et al.

[11] Patent Number: 4,920,090

[45] Date of Patent: Apr. 24, 1990

[54] PROCESS FOR THE FORMATION OF SHAPED AGGLOMERATES FROM PARTICULATE SOLIDS

[75] Inventors: Wolfgang Ritter, Haan; Hans-Peter Handwerk, Duesseldorf; Franz-Josef Carduck, Haan, all of Fed. Rep. of Germany

[73] Assignee: Henkel Kommanditgesellschaft auf Aktien, Duesseldorf, Fed. Rep. of Germany

[21] Appl. No.: 280,400

[22] Filed: Dec. 5, 1988

Related U.S. Application Data

[63] Continuation-in-part of Ser. No. 193,973, May 13, 1988, Pat. No. 4,866,023.

[30] Foreign Application Priority Data

May 15, 1987 [DE] Fed. Rep. of Germany ....... 3716286
Dec. 7, 1987 [DE] Fed. Rep. of Germany ....... 3741337

[51] Int. Cl.$^5$ ............................................. B01J 32/00
[52] U.S. Cl. ..................................... 502/439; 502/400
[58] Field of Search .................. 502/400, 439, 527; 23/313 R

[56] References Cited

U.S. PATENT DOCUMENTS

| | | | |
|---|---|---|---|
| 3,264,069 | 8/1966 | Getty | 23/313 R |
| 4,145,314 | 3/1979 | Func et al. | 502/185 X |
| 4,159,969 | 7/1979 | Moné et al. | 502/439 X |
| 4,316,813 | 2/1982 | Voss | 502/400 X |
| 4,657,880 | 4/1987 | Lachman et al. | 502/527 X |
| 4,670,181 | 6/1987 | Mollinger et al. | 23/313 R |

FOREIGN PATENT DOCUMENTS

| | | |
|---|---|---|
| 0167690 | 1/1986 | European Pat. Off. |
| 2351120 | 4/1975 | Fed. Rep. of Germany |
| 1255593 | 1/1961 | France |
| 2261063 | 2/1975 | France |
| 1487667 | 10/1977 | United Kingdom |
| 1595054 | 8/1981 | United Kingdom |

OTHER PUBLICATIONS

Journal of Polymer Science, Part. C, 16 (1967), 1191–1209.
Above References A, B, E and F were cited in Parent Application Ser. No. 193,973.

*Primary Examiner*—W. J. Shine
*Attorney, Agent, or Firm*—Ernest G. Szoke; Wayne C. Jaeschke; Norvell E. Widsom, Jr.

[57] ABSTRACT

A new method of forming agglomerates of fine powdered solids comprises dispersing the powder in a chemically inert carrier liquid that also contains a dissolved binder precursor polymer with cyclic dicarboxylic acid anhydride groups on the polymer chain. The dispersion is shaped and then brought into contact with a second carrier liquid that contains polyamines. The polyamines react with the anhydride groups on the other polymer to form an insoluble binder polymer that hardens the shaped dispersion. The hardened shape can then be separated from the liquids and/or further reacted if desired to produce amide bonds in the final agglomerates. The method is useful for forming mechanically and thermally stable agglomerates of such materials as activated carbon, metals dispersed on catalyst carriers, etc.

20 Claims, No Drawings

PROCESS FOR THE FORMATION OF SHAPED AGGLOMERATES FROM PARTICULATE SOLIDS

CROSS REFERENCE TO RELATED APPLICATION

This application is a continuation-in-part of U.S. application Ser. No. 193,973, filed May 13, 1988, now U.S. Pat. No. 4,866,023, the entire specification of which is hereby incorporated herein by reference.

FIELD OF THE INVENTION

This invention relates to a new process for the agglomeration of finely divided particulate solids into bodies of selected shape and size, particularly free flowing bodies that may be used, for purposes to which their constituent particulate solids are well adapted, more conveniently than the constituent particles. This invention utilizes binders of increased thermal stability.

STATEMENT OF RELATED ART

Applicants' earlier patent application Ser. No. 193,973, filed May 13, 1988, teaches a process for the shaping agglomeration of particulate solids using a polymeric binder precursor. The binder precursor contains acidic groups, suitable for forming insoluble salts, and is in solution in a liquid phase, with the particulate solids suspended in the liquid phase. The mixture of binder precursor, liquid phase and particulate solids to be agglomerated is worked up into a paste-like formable mass which is then shaped and contacted in shaped form with a solution of cations that form insoluble solids by reacting with the acid groups of the polymeric binder precursor. It is preferred to use aqueous or aqueous/organic intermiscible liquid phases in the two reaction components.

The present invention seeks further to develop the general working principles and teachings of the earlier application by producing shaped agglomerates with increased thermal stability. This is of particular importance for all those applications where the shaped agglomerates are strongly heated during in use but nevertheless are required substantially to retain their original shape. One typical application involving such a requirement is catalysts designed to be used at elevated temperatures, particularly in fluidized beds or in reactors in which the rate and turbulence of flow through a packed bed of material should remain substantially constant during use in order to direct chemical reactions toward the desired products.

DESCRIPTION OF THE INVENTION

Except in the working examples, or where otherwise specifically indicated, all numbers herein describing amounts of materials or reaction conditions are to be understood as modified by the word "about".

Increased thermal stability is achieved in this invention by using combinations of binders and hardening reagents that can react to produce cyclic imide structures in the final product agglomerates. Particularly preferable are cyclic imides formed from acids having two carboxyl groups, one on each of two adjacent positions on an aromatic ring, such acids being briefly denoted herein as "ortho acids" and their cyclic anhydrides as "ortho anhydrides". In one embodiment of the invention, finely divided particulate solids are suspended in an inert, non-aqueous liquid phase together with a polymeric binder precursor that is at least partly soluble in the liquid phase and contains ortho anhydrides, and the binder, liquid phase and solid to be agglomerated are worked up into a formable mass which is then shaped. The shaped temporary agglomerates thus formed are contacted with anhydridereactive polyamines under suitable conditions for the polyamines to react with the anhydride groups at least at the surface of the shaped agglomerates. It has surprisingly been found that such reaction is almost instantaneous, being practically complete within a few minutes, and, particularly when polyamines containing primary amino groups are used, the reaction effects sufficiently rapid crosslinking of the surface of the shaped agglomerates to prevent unwanted tackiness of the agglomerates during their subsequent handling.

The reaction of a dicarboxylic anhydride group with an amino group, particularly a primary amino group, is known to take place in stages. In the first stage, an amidocarboxylic acid is formed with cleavage of the anhydride ring. In the presence of excess amine, the remaining carboxyl group of the amidocarboxylic acid reacts to form the corresponding ammonium salt. The recyclization reaction then takes place, in the continuing presence of heat, to form an imide linkage while water of reaction and the salt-forming amine group present, if any, are eliminated. Multistep reaction cycles such as these also take place in the process according to this invention, the choice of the process conditions according to the invention ensuring that adequate solidification of the formable starting mass containing the particulate solids to be agglomerated actually takes place in the first reaction step, where the anhydride groups react with the polyamines to form crosslinking polyamidocarboxylic acid groups.

According to this invention, an agglomerate completely or partially solidified in this phase of the reaction may be removed from the agglomeration process and put to the intended use. Thus, for example, a catalyst agglomerated in this way may be used in this state to fill a reactor. It may then be advisable to convert the amidocarboxylic acid groups into cyclic imide groups in situ in the reactor in a preliminary reaction phase. Equally, however, it is of course possible to carry out the final phase of the cyclizing imide forming reaction, and thereby to establish the final state of the crosslinking bridge members in the agglomerates produced, in the course of the agglomeration process before making use of the product. This may be done in several stages or, if desired, in a single stage sufficiently prolonged to assure complete reaction.

In one preferred embodiment of the process according to the invention, the shaped polymer-containing starting material containing ortho anhydride groups in the polymer is introduced into a solution of the polyamines in inert, substantially anhydrous carrier liquids. These carrier liquids for the polyamines are miscible with the inert liquid phase from the shaped polymer-containing material and, more preferably, are identical therewith.

Preferred carrier liquids for the two reactants are polar organic solvents of the type used in the prior art in the production of polyamidocarboxylic acids and cyclic polyimides. Suitable materials are, for example, N,N-dialkylcarboxylamides that are liquid under the reaction conditions, the low molecular weight members of this class being particularly preferred. Examples of such materials are N,N-dimethylformamide and N,N-dimethylacetamide. They may readily be removed from the polyamidocarboxylic acid and/or the shaped agglomerates by evaporation, displacement or diffusion. Other typical compounds from this class of are N,N-diethylformamide, N,N-diethylacetamide and N,N-dimethylmethoxyacetamide.

Other suitable inert organic polar liquids are, for example, dimethyl sulfoxide, N-methyl-2-pyrrolidone, pyridine, dimethyl sulfone, hexamethyl phosphoramide, tetramethylene sulfone and dimethyl tetramethylene sulfone.

All these materials may be used either individually or in combination with one another or even in combination with other components, for example benzene, benzonitrile, dioxane, caprolactone, xylene, toluene and/or cyclohexane. As already known, it is best to establish anhydrous or at least substantially anhydrous conditions to ensure the adequate formation of amidocarboxylic acid groups. For relevant literature, see for example *Journal of Polymer Science*, Part C, 16 (1967), 1191-1209.

The process according to the invention is characterized by a plurality of component steps. The first component step comprises the following elements:

The active materials to be agglomerated are used in sufficiently finely divided form together with a liquid phase in which these active materials are not completely soluble and preferably are nearly or totally insoluble, so that the formation of formable solids suspensions is possible. At the same time, a polymeric binder precursor is used which, in this first step of the process, is at least partly soluble in the liquid phase selected, but contains certain functional groups which readily enable the soluble polymer to be converted into the insoluble state. Preferably, the groups in question are dicarboxylic anhydride groups, ortho anhydride groups being particularly preferred.

The multi-component mixture of liquid phase, dissolved polymeric binder precursor and solids dispersed or suspended therein is formed into the desired 3-dimensional shape of the agglomerate particles to be produced. These agglomerates are then exposed to the action of polyamines which react with the anhydride groups of the polymeric binder precursor to form an insoluble solid. It is preferable, through the selection and use of particularly highly reactive amino groups, to achieve such rapid solidification of at least the outer regions of the shaped multi-component body that adequate stabilization of the predetermined shape and prevention of unwanted caking together of the agglomerate particles are guaranteed. The stabilization achieved should be at least sufficient so that the agglomerates formed resist deformation by the force of gravity acting on them, and often considerably higher mechanical strength is achieved.

In an optional later step, the stabilization and solidification of the insoluble crosslinked polymer compounds can be advanced into deeper layers of the agglomerates, penetrating eventually to the point where the material as a whole solidifies.

Particularly suitable highly reactive amino groups are aliphatic primary amino groups, so that it is advantageous to use at least some aliphatic primary polyamines in the polyamine reactant. On the other hand, aromatic polyamines lead to increased thermal stability in the final polyimide molecule but often have a comparatively low reaction velocity with dicarboxylic anhydride groups. Accordingly, the present invention encompasses both the use of aromatic polyamines alone and the combined use of a mixture of aliphatic and aromatic polyamine components. The aliphatic polyamine components can guarantee adequate solidification of the agglomerate form in a first reaction step while the aromatic polyamines introduced into the mixture can react later with reactive parts of the polymeric binder precursor still present in later stages of the process, to form particularly heat-stable imide groups.

Particularly preferable amine components are aliphatic and/or aromatic diprimary amines. Suitable components of this type are, in particular, compounds corresponding to the general formula $H_2N-R-NH_2$, in which R is a difunctional organic radical containing at least 2 and preferably at least 5 carbon atoms and in which the two amino groups are attached to different carbon atoms of the radical R. The radical R can be a simple aliphatic, cycloaliphatic, or aromatic radical. In addition, however, R may also contain a combination of aromatic and aliphatic radicals, a heterocyclic radical, an organic radical provided with bridge members, the bridge members being, in particular, oxygen, nitrogen, sulfur, phosphorus, or an organosilicon radical and also substitution products of these bridge members, for example corresponding oxygen-substituted bond elements.

The highest reactivity to the cyclic carboxylic anhydride groups is generally shown by the aliphatic and/or cycloaliphatic diprimary diamines or mixed aliphatic/aromatic diamines in which the primary amino groups are present as substituents at the aliphatic radicals of these mixed molecules. Accordingly, in order rapidly to harden at least the outer surfaces of the shaped reaction mixture during its reaction with the polyamine components, it can be of advantage at least partly to use such highly reactive polyamines. Suitable aliphatic polyamines, particularly corresponding diprimary diamines, contain at least 2 and preferably at least 5 carbon atoms in the radical R, the upper limit being 15 and more preferably 12 carbon atoms. Accordingly, examples of suitable aliphatic diprimary diamines are hexamethylenediamine, heptamethylenediamine, octamethylenediamine, nonamethylenediamine, and decamethylenediamine. Instead of linear and/or branched carbon chains, corresponding cycloaliphatic amines of the cyclohexane diamine type, in which the amino groups may be present in the 1,2-, 1,3- and, in particular, in the 1,4-position, may also be present. Correspondingly substituted cycloaliphatic amines, for example cycloaliphatic diamines substituted by lower alkyl radicals, are also suitable.

Aromatic polyamines suitable for the purposes of the invention may contain one or more aromatic radicals. Where several aromatic radicals are present, they may be fused with one another, attached directly to one another, or attached to one another by chains, for example those of the type mentioned. Suitable aromatic components are, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 3,3'-diaminodiphenyl sulfone, 4,4'-diaminodiphenyl ether, 2,6-diaminopyridine, bis-(4-aminophenyl)-diethyl silane, bis-(4-aminophenyl)-phosphine oxide, bis-(4-aminophenyl)-N-methylamine, 1,5-diaminonaphthalene, 3,3'-dimethyl-4,4'-diaminodiphenyl, 3,3'-dimethoxybenzidine,2,4-bis-(β-amino-t-butyl)-toluene, bis-(p-β-amino-t-butylphenyl)-ether, p-bis-(2-methyl-4- aminopentyl)-benzene, p-bis-(1,1-dimethyl-5-aminopentyl)-benzene, m-xylylene diamine, p-xylylenediamine and mixtures thereof.

Other examples of suitable diprimary diamines are 3-methylheptamethylene diamine, 4,4-dimethylheptamethylene diamine, 2,11-diaminododecane, 1,2-bis-(3-aminopropoxy)-ethane, 2,2-dimethylpropylene diamine, 3-methoxyhexamethylene diamine, 2,5-dimethylhexamethylene diamine, 2,5-dimethylheptamethylene diamine, 5-methylnonamethylene diamine, 1,12-diaminooctadecane, 2,5-diamino-1,3,4-oxadiazole and compounds corresponding to the following formulae:
$H_2N(CH_2)_3O(CH_2)_2O(CH_2)_3NH_2$,
$H_2N(CH_2)_3S(CH_2)_3NH_2$, and
$H_2N(CH_2)_3N(CH_3)(CH_2)_3NH_2$.

The amine-reactive polymeric binder precursor component containing dicarboxylic anhydride groups can be any polymer or copolymer which has an adequate content of dicarboxylic anhydride groups in the polymer molecule. Polymer compounds in which the dicarboxylic anhydride groups make up at least 10 atomic % and, more especially, at least 20 atomic % of the polymer molecule are preferred. Particularly suitable polymeric binders are maleic anhydride copolymers in which the maleic anhydride content makes up at least 25 atomic % and, more preferably, about 30 to 70 atomic %.

It can be advantageous to use comparatively temperature-stable components in addition to the maleic anhydride (also denoted "MAH" herein below) as copolymer components in the polymeric binder precursor used for this invention. Examples of such temperature-stable components are lower α-olefins, particularly ethylene and/or propylene, and also comonomers of the vinyl methyl ether type and comparable compounds. Good results are obtained in the process according to this invention where, for example, copolymers with a molar ratio MAH/ethylene of 1:1 or MAH/vinyl methyl ether of 1:1 are used. Compounds of this type are commercially available, as for example the products marketed under the names "EMA 21 TM" by Monsanto and "Gantrez AN 139 TM" by GAF Corp. Copolymers of maleic anhydride with at least one of the following comonomers are also suitable: allylacetate, acrylamide, methylacrylate, acrylonitrile, 2-butene, cyclopentene, cyclohexene, cyclooctene, butylvinyl ether, methyl methacrylate, N-vinyl phthimide, propene, styrene, stilbene, α-methylstyrene, N-vinyl succinimide and vinyl acetate.

The process according to the invention uses two liquid-containing phases which are combined in the course of the process to form a single liquid phase. Mutually intermiscible liquids are preferably used in the two phases which are initially kept separate. These liquids are preferably substantially or completely anhydrous and are referred to generically in the following as "carriers".

The multi-phase mixture, used in the process according to the invention, which contains the solid to be agglomerated and the polymeric binder precursor is described first in the following. The material to be agglomerated is generally present in the form of small solid particles. Examples of such materials are metal powders, insoluble metal compounds, such as metal oxides or metal sulfides, insoluble metal salts, and the like. The materials in question generally contain the active material for the intended use of the agglomerate, but instead they may contain a precursor of the active material that can be converted into the active material in situ in the agglomerate by a suitable reaction, for example by reduction or oxidation, dehydration or the like.

One particularly important example of an active material that can usefully be agglomerated according to this invention is active carbon, which may be used on its own, for example for the production of active carbon beds, or together with metallic and/or other inorganic components. Important applications for such combinations arise, for example, in the field of catalyst production, particularly in the simplified production of granular, free-flowing catalysts. However, the process according to the invention also comprises the shaping agglomeration of insoluble, finely divided components of any kind.

Typical examples of materials which may be agglomerated in the process according to the invention are known absorbents, ion exchangers and, quite generally, support materials, which may be used as such, or after being coated with a variety of different components as so-called "stationary phases" for analytical or preparative chromatography.

For many of the applications in the fields mentioned here, it is very often necessary to agglomerate finely or very finely divided natural and/or synthetic materials and at the same time to provide a preferred highly porous structure of the agglomerates. The invention described herein opens up new possibilities in this regard.

In addition to the active carbon already mentioned, typical absorbents are, for example, such compounds as iron oxide, magnesium silicates, aluminium oxides, silica gel, aluminium hydroxide, calcium hydroxide, calcium carbonate, calcium sulfate, talcum and also organic components of the sugar type, the starch type, the cellulose powder type and the like. In the field of ion exchangers, the process according to this invention may be considered equally well for cation exchangers and for anion exchangers. The first group includes, for example, sulfonate resins, carboxylate resins, oxycellulose, bleaching earths, basic oxides, for example based on aluminium oxide, and/or silica gel and the like. Anion exchangers are known resins containing quaternary, tertiary and/or primary amino groups, acidic bleaching earths, acidic aluminium oxide and so-called acidic carbons. Suitable support materials for stationary phases are, for example, starch, cellulose, silica gel, kieselguhr, rubber powder and the like.

Suitable polymeric binders of the type mentioned which contain dicarboxylic anhydride groups and which are soluble in appropriate carriers used for this invention preferably have number average molecular weights (denoted herein as "$M_n$") of 500 to 5,000,000 and more preferably from 1,000 to 500,000. Preferred binder precursor concentrations in the first processing step under discussion here are in the range from 1 to 30% by weight and more preferably in the range from 1 to 20% by weight and still more preferably in the range from 2 to 10% by weight, based in each case on the formable mixture of carrier, polymeric binder, and solid to be agglomerated.

The concentration of the polymeric binder precursor and its average molecular weight influence the viscosity of the multi-component mixture of carrier, polymeric binder precursor and finely divided solids which is to be processed by shaping or forming. The viscosity of the multi-component mixture may be selected within a wide range in dependence upon the particular procedure adopted as described in detail hereinafter. Suitable viscosities of the solid suspensions are, for example, viscosities of from about 100 to 2,000,000 milliPascal seconds (hereinafter "mPa.s"). Fluid to paste-like formable solid suspensions containing about 1 to 15% by weight polymeric binder precursor and about 10 to 60% by weight finely divided solids to about 20 to 90% by weight liquid carrier (the percentages by weight being based in each case on the total 3-component mixture) have proved to be particularly suitable.

The mixtures containing the binder precursor and finely divided solid may be shaped or formed in particular by two types of process:

A first embodiment uses comparatively thin-flowing solid suspensions which preferably have viscosities of 100 to 4,000 mPa.s. Fluid masses such as these may be solidified in shaped form after adequate homogenization by dropwise addition of this multi-phase mixture to a solution of the reactive polyamines. Depending on the particular process conditions selected, lenticular to spherical reaction bodies are generally obtained, assuming their shape directly on entering the solution of the reactive polyamine components and largely retaining it in the further course of the process. Depending on the process conditions, it is possible to obtain either substantially solid or substantially hollow, approximately spherical, precipitation products of the described type.

In a second embodiment, the process according to the invention may also be put into practice by shaping or forming highly viscous suspensions containing comparatively high molecular weight binders and finely divided solids under the effect of mechanical forces and then introducing them into, or spraying them with, the polyamine-containing hardening solution, if desired after size reduction. For example, filament-like strands may be introduced as such or after size reduction into a solution of the polyamines and solidified therein by crosslinking of the binder precursor. If desired, the solidified material may be further size-reduced even after an initial treatment in or with the polyamine containing hardening solution.

The second reaction component used to crosslink the polymeric binder precursor through the above-mentioned formation of aminocarboxylic acid groups and/or imide groups is the solution of suitable components containing reactive polyamines. The use or co-use of comparatively highly reactive primary polyamines, particularly corresponding aliphatic diprimary diamines, leads to particularly rapid crosslinking of the shaped solids suspension, at least in the outer regions. Therefore, it is advantageous, where aliphatic and aromatic polyamines are used together, to use mixtures of such compounds containing at least 5% and, more preferably, 5 to 50% aliphatic diamines (% by weight, based on the amine mixture).

The polyamine component is preferably used in the form of a comparatively dilute solution, polyamine contents in a solvent carrier of from 0.5 to 25% by weight and more preferably from 1 to 10% by weight being particularly suitable (% by weight based in each case on the polyamine solution used).

For the process according to this invention, a temperature range from room temperature to at most the boiling temperature under reaction conditions of any of the solution components, more especially the temperature range from about room temperature to about 100° C., is particularly suitable. Sometimes it is advantageous to contact the shaped polymer-containing masses with the polyamine solution at room temperature or only moderately elevated temperature and then later to subject the multi-phase reaction mixture to an after-reaction in the presence of the liquid phase at a higher temperature. If desired, this after-reaction may be carried out with moderate agitation. The shaped polymer-containing component may be introduced into the solution of the polyamine component, for example by dropwise addition, using such an excess of inert solvent carrier that the shaped agglomerates are present as disperse phase in a continuous liquid phase consisting essentially of inert carrier. The sufficiently solidified shaped agglomerates are then separated from the solvent, if desired washed and dried, and then either used for the application envisaged or subjected to an after-reaction at preferably elevated temperatures. This after-reaction can be carried out under such conditions that residual carrier liquid, water of reaction, and any excess polyamine present are driven out with simultaneous formation of cross links. It has been found that, by this means, it is possible to increase the porosity of the solid final agglomerates. Examination of the particles under an electron microscope shows that the agglomerated solids ultimately accumulating are distinguished by porosity throughout the solid material. Materials particularly suitable for many applications can be produced in this way.

In one important embodiment of the process according to the invention, the agglomerates initially solidified at room temperature or only moderately elevated temperature, especially below 100° C., and then washed and, if desired, dried, are subjected to a subsequent heat treatment at a temperature of at least about 100° C. The presence of imide crosslinkages may then be detected at this stage at the latest by methods known per se, for example by IR spectral analysis. At the same time, a desirable open-pored structure is also formed, even in the outer regions of the particular shaped particle. The heat treatment may be carried out either in air or in an inert gas atmosphere. In addition, it may be carried out on the washed material and, if desired, also on the unwashed or only minimally washed material.

In one embodiment of the invention, the solidified agglomerates are treated with ammonia, particularly with dilute aqueous ammonia solution before the final heat treatment. It is possible in this way to increase the activity of the shaped agglomerates ultimately obtained.

Additional modification of the surface of the solidified particles may be appropriate for certain applications. Thus, it may be desirable to roughen the surface by a mechanical treatment to optimally adapt the overall porosity and other structural features of the agglomerates formed to their intended use. For example, a solid which has accumulated in granular or bead-like form may simply be rolled as such. The resulting minimal abrasion on the grain surface is all that is necessary to reestablish access, to the desired extent, to the porous inner structure of the grains or beads.

It is possible by the process according to the invention to produce agglomerates with average particle sizes in the range from 1 to 20 mm, preferably in the range from about 1 to 10 mm, and more preferably in the range from about 2 to 7 mm. Finely powdered starting materials of virtually any fine particle size may be used for the production of these agglomerates.

Special characteristics of the finely divided solids to be agglomerated may be derived from the intended application of the shaped agglomerates produced in accordance with the invention. Important examples are typical catalyst components, for example insoluble compounds of or elemental platinum, palladium, rhodium, and nickel, in the absence or presence of supports, such as active carbon, kieselguhr, aluminium oxide, calcium carbonate, and the like. Oxidic catalyst components, for example of the copper chromite type, which are insoluble in water, are also particularly suitable for processing by the process according to the invention. Further examples are silicate-containing shaped particles, for example particles containing alumosilicates, such as zeolites.

In one preferred embodiment of the invention, the process is used for the agglomeration of active carbon or multi-component mixtures containing active carbon to form corresponding granular catalysts, for example containing heavy metals.

The practice of the invention may be further understood with the aid of the following non-limiting examples. Production of shaped agglomerates in accordance with the invention, except without the presence of active materials, is described first in the following. The Examples according to the invention then describe practical embodiments of the agglomeration of valuable active materials by the process according to the invention.

PRELIMINARY TESTS

In preliminary tests, unfilled crosslinked shaped agglomerates are prepared as follows:

Commercial maleic anhydride copolymers, either an ethylene/maleic anhydride (1:1) type called "EMA 21 TM" (from Monsanto) or a vinyl methyl ether/maleic anhydride (1:1) type called "Gantrez AN 139 TM" (GAF) are dissolved in dimethyl formamide (10% by weight solution). A 5% by weight solution of 1,6-hexamethylenediamine (HMDA) in dimethyl formamide is separately prepared.

To form the shaped bodies, the polymer solution is introduced dropwise through a V4A sieve (hole diameter 2 mm) into the 5% diamine solution in dimethyl formamide at room temperature.

For solidification purposes, the shaped agglomerates are stored for 1 hour in a hardening bath (HMDA-DMF). The shaped agglomerates stored in the hardening bath are then filtered off and treated and isolated by various methods:

A1: washed with distilled water in a sintered glass vacuum filter until the effluent is neutral (pH 7.0) and dried in air at room temperature
A2: washed with distilled water in a sintered glass vacuum filter until the effluent is neutral (pH 7.0) and dried for 24 hours at 125° C.
A3: washed with distilled water in a sintered glass vacuum filter until the effluent is neutral (pH 7.0) and dried for 16 hours at 200° C.
A4: washed with distilled water in a sintered glass vacuum filter until the effluent is neutral (pH 7.0), dried for 24 hours at 125° C. and then conditioned for 5 hours at 300° C. in a nitrogen atmosphere.

For characterization purposes, the shaped bodies formed are tested by IR spectrum analysis for the presence of the characteristic imide bands (1770 and 750 wave numbers). In addition, the decomposition temperature is determined by thermogravimetry on powdered shaped body material (using a DuPont 990 Thermal Analyzer, heating rate 20° C./minute). Finally, the strength of the shaped bodies is determined with a model 4M instrument made by Dr. Schleuniger Productronic AG for measuring the compressive strength of tablets. The measurement is carried out at a constant and defined loading rate of 20 N/sec by controlled drive (measurement rate: 5–300 N).

The properties of the shaped bodies formed according to the foregoing descriptions under A1–A4 are shown in Table I.

In the following Examples, shaped agglomerates including active materials are produced by the method according to the invention and tested for their properties.

EXAMPLES

General procedure

The MAH copolymer specified in Tables II–IV is dissolved in dimethyl formamide. The valuable materials mentioned below, which are all insoluble in dimethyl formamide, are stirred into the resulting solution:
Active carbon (from Degussa)
Copper chromite
Nickel on $SiO_2$ (Type E480P from the Calsicat Division of Mallinckrodt, Inc.)
Zeolites (Types Fe/Z/C and Na-M1 from Norton Company, England)

After adequate dispersion, the slurry formed is added dropwise to a 5% hexamethylenediamine (HMDA) solution in dimethyl formamide (DMF). For further solidification, the shaped agglomerates thus formed are stored for 1 hour in a hardening bath (HMDA/DMF). The shaped agglomerates are then filtered under suction in a sintered-glass vacuum filter and washed with distilled water until the effluent water is neutral (pH 7.0). To form the imide structure, the granulated material is subsequently treated for 24 hours at 125° C.

Tables II–IV below show the composition of the starting slurries, with binder precursor (polyanhydride containing polymer) and active material shown specifically and carrier liquid (DMF) making up the balance; type of post treatment; and some properties of the agglomerates formed.

TABLE I

| | | Properties of the shaped agglomerates | | | |
|---|---|---|---|---|---|
| Ref. | Drying Temperature | Imide signal at 1770 and 750 wave numbers | Evaporation of a volatile, non-polymer-bound raction in the temperature range | Decomposition temperature | Strength at room temperature |
| A1 | Room temperature | negative | 100–225° C. | approx. 300° C. | 15 N |
| A2 | 125° C. | positive | 250–300° C. | approx. 450° C. | 40 N |
| A3 | 200° C. | positive | 300° C. | 450–470° C. | 25 N |

TABLE I-continued

Properties of the shaped agglomerates

| Ref. | Drying Temperature | Imide signal at 1770 and 750 wave numbers | Evaporation of a volatile, non-polymer-bound raction in the temperature range | Decomposition temperature | Strength at room temperature |
|---|---|---|---|---|---|
| A4 | 300° C. | positive | 350–400° C. | 450–470° C. | 3 N |

TABLE II

Shaped active carbon agglomerates

| Example Number | Polymer Type | % by wt. | Active material | % by wt. | After-treatment | Strength N at room temperature | Internal structure of shaped agglomerates open-pored |
|---|---|---|---|---|---|---|---|
| 1.1 | Gantrez | 2.3 | A-carbon | 30 | — | 15 | + |
| 1.2 | AN 139 | 2.3 | A-carbon | 30 | rolled for 30 mins. | 15 | + |
| 1.3 | | 2.3 | A-carbon | 30 | NH$_3$-treatment | 22 | + |
| 1.4 | | 2.3 | A-carbon | 30 | 3 h 220° C. | 10 | + |
| 2.1 | Gantrez | 3.4 | A-carbon | 30 | — | 20 | + |
| 2.2 | AN 139 | 3.4 | A-carbon | 30 | rolled for 30 mins. | 25 | + |
| 2.3 | | 3.4 | A-carbon | 30 | NH$_3$-treatment | 30 | + |
| 2.4 | | 3.4 | A-carbon | 30 | 3 h 220° C. | 8 | + |
| 3.1 | Gantrez | 4.8 | A-carbon | 29 | — | 40 | + |
| 3.2 | AN 139 | 4.8 | A-carbon | 29 | rolled for 30 mins. | 40 | + |
| 4.1 | Gantrez | 5.8 | A-carbon | 35 | — | 40 | + |
| 4.2 | AN 139 | 5.8 | A-carbon | 35 | rolled for 30 mins. | 35 | + |
| 4.3 | | 5.8 | A-carbon | 35 | reduced | 10 | + |
| 5.1 | Gantrez | 10 | A-carbon | 25 | — | 30 | + |
| 5.2 | AN 139 | 10 | A-carbon | 25 | rolled for 30 mins. | 30 | + |
| 6.1 | EMA 21 | 6.6 | A-carbon | 27.4 | — | 20 | + |
| 6.2 | | 6.6 | A-carbon | 27.4 | rolled for 30 mins. | 20 | + |
| 6.3 | | 6.6 | A-carbon | 27.4 | NH$_3$-treatment | 20 | + |
| 7.1 | EMA 21 | 9 | A-carbon | 27 | — | 25 | + |
| 7.2 | | 9 | A-carbon | 27 | rolled for 30 mins. | 25 | + |
| 7.3 | EMA 21 | 9 | A-carbon | 27 | NH$_3$-treatment | 30 | + |

TABLE III

Shaped copper chromite agglomerates

| Example Number | Polymer Type | % by wt. | Active material | % by wt. | After-treatment | Strength N at room temperature | Property of the shaped agglomerates internal structure open-pored internal structure |
|---|---|---|---|---|---|---|---|
| 8.1 | Gantrez | 4 | Cu chromite | 36 | — | 40 | + |
| 8.2 | AN 139 | 4 | Cu chromite | 36 | rolled for 30 mins. | 40 | + |
| 9.1 | Gantrez | 6.8 | Cu chromite | 33 | — | 40 | + |
| 9.2 | AN 139 | 6.8 | Cu chromite | 33 | rolled for 30 mins. | 40 | + |

TABLE IV

Various Active Materials

| Example | Polymer | % by wt. | Active Material | % by wt. | Strength N at RT |
|---|---|---|---|---|---|
| 10 | Gantrez AN 139 | 3.6 | SASIL ®* | 50.0 | 30 |
| 11 | Gantrez AN 139 | 6.2 | Ni/SiO$_2$ | 36.6 | 10 |
| 12 | Gantrez AN 139 | 6.7 | Ni/SiO$_2$ | 33.0 | 18 |
| 13 | Gantrez AN 139 | 10.0 | Zeolite Fe/Z/C | 25.0 | 30 |
| 14 | Gantrez AN 139 | 10.0 | Zeolite Na-M1 | 25.0 | 35 |
| 15 | EMA 21 | 6.0 | Ni/SiO$_2$ | 40.0 | 5 |

*Sodium aluminum silicate zeolite from Henkel KGaA

The after-treatments of the shaped agglomerates noted in some of these Examples are for surface microstructure modification. They produce a structure, even in the outer surface, which allows unimpeded access to the open-pore inner structure. The following after-treatments are used:

1. Ammonia treatment

The shaped agglomerates are immersed for 5 minutes in a 0.1% aqueous ammonia solution, filtered under suction in a sintered-glass vacuum filter, washed with distilled water and dried for 24 hours at 125° C.

2. Mechanical treatment (rolling)

The shaped agglomerates are placed in a glass bottle and rolled for 30 mins–2 hours on a roll stand. The dust-like fines produced are then removed by sifting.

3. Heating

The shaped agglomerates are heated in air for 3 hours at 230° C. in a porcelain dish or in a nitrogen atmosphere for 3 hours at 300° C. in a stoppered test tube.

The visual appearance of the originally shiny agglomerate surfaces changes to dull and porous as a result of the after-treatments. Scanning electron micrographs confirm the visual impression. The after-treatment established unimpeded access to the open-pore inner structure through the surface regions, even when there were originally signs of incrustation there.

In the Examples described in Table V, crosslinking of the shaped agglomerates (active carbon as the active material) is carried out with octamethylene diamine or with an amine mixture (m-phenylene diamine/HMDA 1:1) and compared with the corresponding HMDA-crosslinked product.

TABLE V

| Example Number | Polymer | % by wt. | Active Material | % by wt. | Diamine (5% in DMF) | Strength, N at RT |
| --- | --- | --- | --- | --- | --- | --- |
| 16 | Gantrez AN 139 | 4.8 | A carbon | 29 | hexamethylendiamine | 30 |
| 17 | Gantrez AN 139 | 4.8 | A carbon | 29 | octanmethylinediamine | 25 |
| 18 | Gantrez AN 139 | 5.0 | A carbon | 31 | m-phenylendiamine/ hexamethylendiamine (1:1) | 30 |

We claim:

1. A process for making a shaped agglomerate from finely divided solid particles, comprising the steps of:
   (a) mixing the solid particles with a first carrier liquid phase comprising a solution of binder precursor polymer molecules that contain anhydrides of dicarboxylic acids, said solid particles being less than fully soluble in and chemically non-reactive with said first carrier liquid phase;
   (b) shaping the dispersion formed in step (a) into the desired shape for the final agglomerate; and
   (c) reacting the shaped body formed in step (b) with an effective quantity of anhydride-reactive polyamine molecules to harden at least a surface zone of the shaped body formed in step (b) by converting the binder precursor polymer molecules in this zone to binder polymer molecules, said binder polymer, as a result of reaction between the anhydride and the polyamine, containing sufficient cyclic imide groups and being present in sufficient amount so that the shaped body as a whole detectably absorbs infrared light selectively at about 1770 and about 750 wave numbers.

2. A process according to claim 1, wherein (i) said binder precursor polymer molecules contain at least 10 atomic percent of cyclic anhydride groups having four or five carbon atoms and one oxygen atom in the anhydride ring and (ii) said reacting of step (c) is accomplished by contacting the shaped agglomerate with a solution of the anhydride reactive polyamines in a second carrier liquid that is chemically non-reactive with the polyamines, so as to form in the hardened surface zone, by reaction between the binder precursor polymer molecules in that zone and the polyamines, molecules of binder polymer that are substantially insoluble in the liquid part of the mixture formed by said contacting.

3. A process according to claim 2, wherein said binder precursor polymer molecules are copolymers of at least 25 atomic percent of maleic anhydride with a comonomer that promotes thermal stability of the polymer molecules.

4. A process according to claim 3, wherein at least about 5 percent of said anhydride-reactive polyamine molecules contain at least two primary amine groups attached to an aliphatic group.

5. A process according to claim 2, wherein at least about 5 percent of said anhydride-reactive polyamine molecules contain at least two primary amine groups attached to an aliphatic group.

6. A process according to claim 5, wherein at least about 50% of said anhydride-reactive polyamine molecules include at least two amine groups attached directly to one aromatic ring.

7. A process according to claim 4, wherein at least about 50% of said anhydride-reactive polyamine molecules include at least two amine groups attached directly to one aromatic ring.

8. A process according to claim 2, which produces a final agglomerate with a maximum dimension between about 1 and about 20 millimeters.

9. A process according to claim 3, which produces a final agglomerate with a maximum dimension between about 1 and about 20 millimeters.

10. A process according to claim 4, which produces a final agglomerate with a maximum dimension between about 1 and about 20 millimeters.

11. A process according to claim 5, which produces a final agglomerate with a maximum dimension between about 1 and about 20 millimeters.

12. A process according to claim 6, which produces a final agglomerate with a maximum dimension between about 1 and about 20 millimeters.

13. A process according to claim 7, which produces a final agglomerate with a maximum dimension between about 1 and about 20 millimeters.

14. A process according to claim 1, which produces a final agglomerate with a maximum dimension between about 1 and about 20 millimeters.

15. A process according to claim 14, which produces an agglomerate with internal microporous structure accessible from the exterior of the agglomerate.

16. A process according to claim 8, which produces an agglomerate with internal microporous structure accessible from the exterior of the agglomerate.

17. A process according to claim 5, which produces an agglomerate with internal microporous structure accessible from the exterior of the agglomerate.

18. A process according to claim 3, which produces an agglomerate with internal microporous structure accessible from the exterior of the agglomerate.

19. A process according to claim 2, which produces an agglomerate with internal microporous structure accessible from the exterior of the agglomerate.

20. A process according to claim 1, which produces an agglomerate with internal microporous structure accessible from the exterior of the agglomerate.

* * * * *